US011850772B2

(12) United States Patent
Hayasaka et al.

(10) Patent No.: US 11,850,772 B2
(45) Date of Patent: Dec. 26, 2023

(54) LAMINATE PRODUCTION METHOD

(71) Applicant: ZEON CORPORATION, Tokyo (JP)

(72) Inventors: Kentaro Hayasaka, Tokyo (JP);
Tetsuya Akabane, Tokyo (JP);
Kunihiko Makino, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 466 days.

(21) Appl. No.: 16/632,141

(22) PCT Filed: Jul. 24, 2018

(86) PCT No.: PCT/JP2018/027767
§ 371 (c)(1),
(2) Date: Jan. 17, 2020

(87) PCT Pub. No.: WO2019/022091
PCT Pub. Date: Jan. 31, 2019

(65) Prior Publication Data
US 2020/0230847 A1 Jul. 23, 2020

(30) Foreign Application Priority Data

Jul. 27, 2017 (JP) .................................. 2017-145394

(51) Int. Cl.
*B29C 41/14* (2006.01)
*C08J 5/02* (2006.01)
(Continued)

(52) U.S. Cl.
CPC ........ *B29C 41/20* (2013.01); *A41D 19/01505* (2013.01); *B29C 41/14* (2013.01);
(Continued)

(58) Field of Classification Search
CPC ... B29C 41/14; B29C 41/20; A41D 19/01505; B32B 25/04; B32B 25/10; B32B 25/14;
(Continued)

(56) References Cited

U.S. PATENT DOCUMENTS 5,326,515 A * 7/1994 Sakaki .................... B29C 41/14
264/301
2011/0265246 A1 11/2011 Saito
(Continued)

FOREIGN PATENT DOCUMENTS

EP 3 575 083 A1 12/2019
JP S49-077739 A 7/1974
(Continued)

OTHER PUBLICATIONS

Mar. 25, 2021 Extended Search Report issued in European Patent Application No. 18839242.7.
(Continued)

*Primary Examiner* — Joanna Pleszczynska
(74) *Attorney, Agent, or Firm* — Oliff PLC

(57) ABSTRACT

A method for producing a laminate including a substrate and a rubber layer, the rubber layer having a thickness of 200 μm or more from the surface of the substrate, the method including contacting the substrate in a heated state with a polymer latex having a viscosity of 2,000 to 100,000 mPa·s at 25° C. to thereby coagulate the polymer in contact therewith to form the rubber layer.

9 Claims, 1 Drawing Sheet

(51) Int. Cl.
*A41D 19/015* (2006.01)
*B29C 41/20* (2006.01)
*B32B 5/02* (2006.01)
*B32B 25/10* (2006.01)
*B32B 25/14* (2006.01)
*B32B 37/06* (2006.01)
*B29K 7/00* (2006.01)
*B29L 31/48* (2006.01)

(52) U.S. Cl.
CPC .............. *B32B 5/02* (2013.01); *B32B 25/10* (2013.01); *B32B 25/14* (2013.01); *B32B 37/06* (2013.01); *C08J 5/02* (2013.01); B29K 2007/00 (2013.01); B29K 2713/00 (2013.01); B29L 2031/4864 (2013.01); B32B 2309/02 (2013.01); B32B 2309/105 (2013.01); B32B 2319/00 (2013.01); B32B 2437/02 (2013.01); C08J 2319/02 (2013.01)

(58) Field of Classification Search
CPC ..... B32B 2437/02; C08J 5/02; C08J 2319/02; B29K 2007/00; B29K 2713/00; B29L 2031/4864
See application file for complete search history.

(56) References Cited

U.S. PATENT DOCUMENTS

| | | | |
|---|---|---|---|
| 2014/0041096 A1 | 2/2014 | Takahashi | |
| 2016/0017109 A1* | 1/2016 | Bostyn | C08J 9/30 521/88 |
| 2017/0156422 A1 | 6/2017 | Honjo | |
| 2018/0186128 A1 | 7/2018 | Kato et al. | |
| 2018/0303173 A1 | 10/2018 | Igari et al. | |

FOREIGN PATENT DOCUMENTS

| | | |
|---|---|---|
| JP | S59-053705 A | 3/1984 |
| JP | H01-104634 A | 4/1989 |
| JP | H08-283522 A | 10/1996 |
| JP | 2002-103355 A | 4/2002 |
| JP | 2002-249909 A | 9/2002 |
| JP | 2011-032590 A | 2/2011 |
| JP | 2011-231433 A | 11/2011 |
| JP | 2015-120996 A | 7/2015 |
| WO | 2012/070576 A1 | 5/2012 |
| WO | 2017/010297 A1 | 1/2017 |
| WO | 2017/014029 A1 | 1/2017 |

OTHER PUBLICATIONS

Oct. 16, 2018 Search Report issued in International Patent Application No. PCT/JP2018/027767.

Jan. 28, 2020 International Preliminary Report on Patentability issued in International Patent Application No. PCT/JP2018/027767.

Nov. 16, 2022 Office Action issued in European Patent Application No. 18 839 242.7.

* cited by examiner

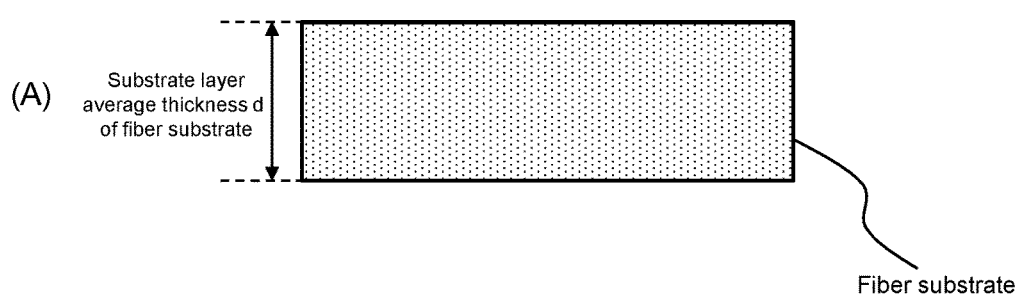
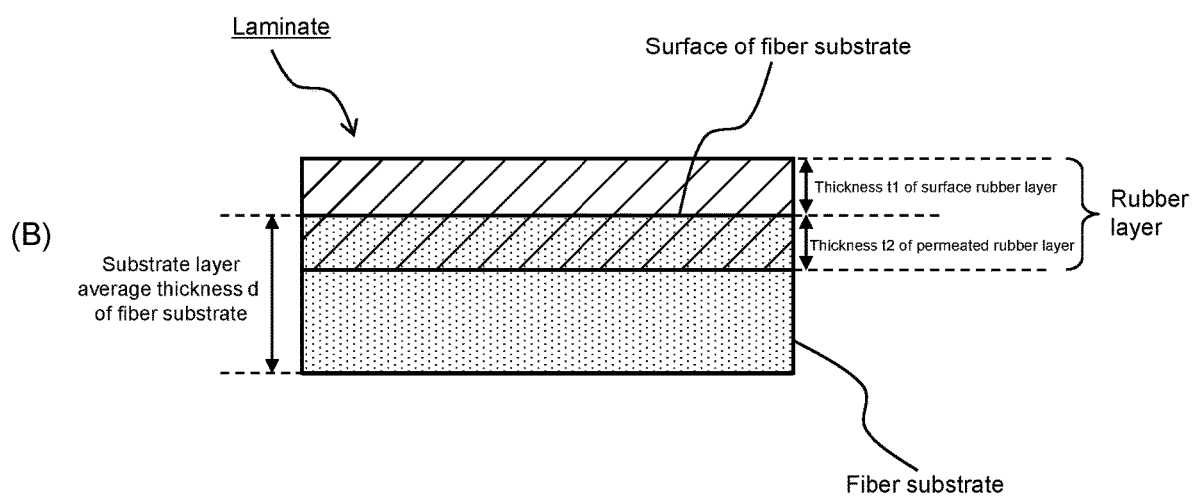

US 11,850,772 B2

LAMINATE PRODUCTION METHOD

TECHNICAL FIELD

The present invention relates to a laminate comprising a substrate and a rubber layer formed from a polymer latex. The present invention also relates to a method for producing a protective glove using the laminate.

BACKGROUND ART

Conventionally, protective gloves whose solvent resistance, grip properties, wear resistance, and the like have been improved by coating fiber gloves with rubber, resin, or the like have been used in various applications, such as manufacturing work in factories, light work, construction work, agricultural work, and the like.

Such protective gloves are required to have excellent flexibility in addition to excellent mechanical strength such as wear resistance and durability as they are typically used in contact with a human body.

For example, Patent Document 1 discloses a method for producing a protective glove in which a surface rubber layer is formed by impregnating a fiber-made glove with a coagulant solution, then dipping the fiber-made glove impregnated with the coagulant solution in a latex composition including a latex of a nitrile rubber.

RELATED ART

Patent Document

PATENT DOCUMENT 1: WO 2012/070576

SUMMARY OF THE INVENTION

Problem to be Solved by the Invention

Meanwhile, regarding the protective gloves, from a viewpoint of improving protection performance against a solvent, a thick surface rubber layer formed on the surface of the fiber glove is desired. Regarding this desire, in the production method described in Patent Document 1 and other methods which use a coagulant solution, a fiber glove as a substrate must be dipped in a latex composition multiple times in order to form a thick surface rubber layer on the surface of the protective glove. However, in such methods, there is a problem of more manufacturing steps. Another problem of these methods is that because the resulting surface rubber layer is formed by multiple times of dip molding, an interface is formed in the surface rubber layer. Due to the interface, the layer tends to peel, leading to poor durability during wearing. Further, another method can be considered in which the surface rubber layer is thickened by using a latex composition with relatively high viscosity for the dip molding. However, in such a method, there is a problem that coagulation does not progress uniformly in a forming process of the surface rubber layer, therefore cracks are formed in the forming process of the surface rubber layer. Such cracks lead to inferior durability during wearing.

The present invention is completed in view of solving the problem above. It is an object of the present invention to provide a method for producing a laminate providing excellent protection performance against a solvent, comfort during wearing, flexibility, and wear resistance in which peeling and cracks in the surface rubber layer unlikely occur. It is also an object of the present invention to provide a method for producing a protective glove using the laminate obtained by such a method.

Means for Solving the Problem

The present inventors, who have conducted extensive research to achieve the objects above, have found that a rubber layer having a thickness of 200 μm or more from a surface of a substrate can be formed on the surface of the substrate by contacting the substrate in a heated state with a polymer latex having a viscosity of 2,000 to 100,000 mPa·s at 25° C. to thereby coagulate the polymer latex in contact therewith, and that a laminate comprising such a rubber layer formed on the substrate has significantly reduced cracks and peeling in the surface rubber layer, and provides excellent protection performance against a solvent, comfort during wearing, flexibility, and wear resistance. The findings have led to the completion of the present invention.

In other words, the present invention provides a method for producing a laminate comprising a substrate and a rubber layer, the rubber layer having a thickness of 200 μm or more from the surface of the substrate, the method comprising contacting the substrate in a heated state with a polymer latex having a viscosity of 2,000 to 100,000 mPa·s at 25° C. to thereby coagulate the polymer latex in contact therewith to form the rubber layer.

In the production method according to the present invention, in the contacting with the polymer latex, the substrate is preferably heated at 30° C. or higher.

In the production method according to the present invention, in the contacting with the polymer latex, the substrate is preferably heated state at 50° C. or higher.

In the production method according to the present invention, the thickness of the substrate is preferably 0.01 to 3,000 mm, and the depth of permeation of the rubber layer into the substrate is preferably 1 μm or more and less than the thickness of the substrate.

In the production method according to the present invention, a polymer constituting the polymer latex is preferably a nitrile rubber.

In the production method according to the present invention, the polymer latex preferably contains a nonionic surfactant.

Further, the present invention provides a method for producing a protective glove using the laminate obtained by the production method described above.

Effects of Invention

The present invention can provide a method for producing a laminate providing excellent protection performance against a solvent, comfort during wearing, flexibility, and wear resistance in which peeling and cracks in the surface rubber layer hardly occur. Further, the present invention can provide a method for producing a protective glove using the laminate obtained by such a production method.

BRIEF DESCRIPTION OF DRAWINGS

FIG. 1(A) is a cross sectional view of a fiber substrate prior to rubber layer formation. FIG. 1(B) is a cross sectional view of a laminate comprising a rubber layer formed on the fiber substrate shown in FIG. 1(A).

DESCRIPTION OF EMBODIMENTS

A method for producing a laminate according to the present invention is a method for producing a laminate comprising a substrate and a rubber layer, the rubber layer having a thickness of 200 µm or more from the surface of the substrate, the method comprising:

contacting the substrate in a heated state with a polymer latex having a viscosity of 2,000 to 100,000 mPa·s at 25° C. to thereby coagulate the polymer latex in contact therewith to form the rubber layer.

The laminate obtained by the production method according to the present invention comprises a substrate and a rubber layer having a thickness of 200 µm or more from the surface of the substrate. The laminate obtained by the production method according to the present invention can be used in applications where flexibility is necessary. Without particular limitation, for example, the laminate is preferably used as a laminate comprising a fiber substrate used as the substrate and the rubber layer, and particularly preferably used in contact with a human body, for example, as a protective glove such as for work, household, agricultural, fishery, industrial use, and the like.

Any fiber substrate made of fibers can be used. Without particular limitation, natural fibers such as cotton, hair, hemp, wool, and the like, and synthetic fibers such as polyester, polyurethane, acrylic, nylon, and the like can be used as a raw material. Among these, nylon is preferably used. Further, the fiber substrate may be a knitted or sewn substrate, or may be a woven or non-woven fabric.

The thickness of the fiber substrate (the substrate layer average thickness d of the fiber substrate described later) is preferably 0.01 to 3.00 am, more preferably 0.02 to 2.00 am, still more preferably 0.03 to 1.5 mm without particular limitation. The linear density of the fiber substrate is preferably 50 to 500 deniers without particular limitation. The gauge number of the fiber substrate is preferably 7 to 18 gauge without particular limitation. Here, the gauge number refers to the number of needles in the knitting machine per inch.

In the production method according to the present invention, the rubber layer is formed by a heat-sensitive coagulating process (a heat-sensitive dipping process) where the substrate in a heated state is contacted with the polymer latex having a viscosity of 2,000 to 100,000 mPa·s at 25° C. and the polymer latex in contact therewith is coagulated by the heat of the substrate, and therefore the laminate comprising the substrate and the rubber layer having a thickness of 200 µm or more from the surface of the substrate is produced.

Specifically, in order to produce the laminate, the substrate in a heated state is dipped in the polymer latex to deposit the polymer latex on the surface of the substrate. Since the polymer latex deposit is in contact with the heated substrate, the polymer latex deposit on the surface of the substrate gels and coagulates to form the rubber layer. Note that when the substrate in a heated state is dipped in the polymer latex, the substrate may be dipped in a state where the substrate covers a mold corresponding to the shape of the substrate. In this case, the glove mold may be heated as well as the substrate. For example, in the case where the laminate is a protective glove, when the glove-shaped fiber substrate in a heated state is dipped in the polymer latex, the glove-shaped fiber substrate may be dipped in a state where the fiber substrate covers a glove mold. In this case, the glove mold may be heated as well as the fiber substrate.

In particular, in such a heat-sensitive coagulating process, by dipping the heated substrate in the polymer latex, the polymer latex is deposited on the surface of the substrate, and the heat of the substrate enables the polymer latex deposit on the surface of the substrate to properly gel and coagulate with relatively high uniformity. Therefore, according to the production method of the present invention, although the polymer latex having a relatively high viscosity of 2,000 to 100,000 mPa·s at 25° C. is used to form a relatively thick polymer latex deposition on the surface of the substrate, the polymer latex can properly gel and coagulate with relatively high uniformity. Then, this can significantly reduce peeling and cracks in the rubber layer even though the rubber layer formed on the substrate has a relatively high thickness of 200 µm or more from the surface of the substrate, and as a result, the obtained laminate can provide excellent protection performance against a solvent, comfort during wearing, flexibility, and wear resistance.

In a preferable aspect of the case where the fiber substrate or the like is used as a substrate such as the case where the laminate is a protective glove or the like, when the heated substrate is dipped in the polymer latex, a part of the polymer latex permeates into the interior of the substrate. In this aspect, the formed rubber layer can have the thickness of 200 µm or more from the surface of the substrate, and a part of the rubber layer can permeate into the interior of the substrate. This enables the obtained laminate to provide excellent wear resistance and protection performance against a solvent.

Here, in reference to FIG. 1(A) and FIG. 1(B), each FIGURE shows a laminate having a fiber substrate and a rubber layer as one embodiment of the laminate obtained by the production method according to the present invention. FIG. 1(A) is a cross sectional view of the fiber substrate prior to rubber layer formation. FIG. 1(B) is a cross sectional view of the laminate comprising the rubber layer formed on the fiber substrate shown in FIG. 1(A). FIG. 1(B) shows an example where the rubber layer is formed covering the fiber substrate in a state where a part of the rubber layer has permeated among the fibers constituting the fiber substrate. Then, in FIG. 1(B), of the rubber layer constituting the laminate, the portion permeated from the surface of the fiber substrate into the gaps among the fibers is referred to as a permeated rubber layer, and of the rubber layer, the portion covering the fiber substrate from the surface of the fiber substrate is referred to as a surface rubber layer. Note that, in the present invention, the rubber layer is described as being composed of a permeated rubber layer and a surface rubber layer as appropriate, but in general, the permeated rubber layer and the surface rubber layer are formed as one body. A description will be made below in reference to FIG. 1(A) and FIG. 1(B) as appropriate.

In the laminate obtained by the production method according to the present invention, the thickness of the rubber layer formed on the substrate from the surface of the substrate (the thickness $t_1$ of the surface rubber layer shown in FIG. 1(B)) is 200 µm or more, from the viewpoint of properly further improving protection performance against a solvent, preferably 200 to 5,000 µm, more preferably 200 to 3,000 µm, still preferably 200 to 2,000 µm, particularly preferably 210 to 2,000 µm. When the thickness of the rubber layer formed on the substrate from the surface of the substrate (the thickness $t_1$ of the surface rubber layer) is less than 200 µm, the obtained laminate may have inferior protection performance against a solvent, and therefore may be unsuitable for uses in which protection performance against a solvent is required, for example, a protective glove use in which protection performance against a solvent is required.

In the laminate obtained by the production method according to the present invention, the thickness of the portion of the rubber layer formed on the substrate that has permeated into the interior of the substrate (the thickness $t_2$ of the permeated rubber layer shown in FIG. 1(B)) is preferably 1 μm or more, more preferably 5 μm or more, still preferably 10 μm or more. By controlling the thickness of the portion that has permeated into the interior of the substrate (the thickness $t_2$ of the permeated rubber layer shown in FIG. 1(B)) within the range described above, the formation of the portion that has permeated into the interior of the substrate (the permeated rubber layer shown in FIG. 1(B)) can be more effective, i.e., the wear resistance and the protection performance against a solvent can be further enhanced. Note that the upper limit of the thickness of the portion of the rubber layer formed on the substrate that has permeated into the interior of the substrate (the thickness $t_2$ of the permeated rubber layer shown in FIG. 1(B)) is not particularly limited, but from the viewpoint of preventing pass through in which the rubber layer reaches the other surface of the substrate, preferably less than the thickness of the substrate (the substrate layer average thickness d of fiber substrate shown in FIG. 1(B)), and from the viewpoint of flexibility, preferably 3,000 μm or less, more preferably 2,000 μm or less. Note that when pass through in which the rubber layer reaches the other surface of the substrate occurs, the comfort during wearing can become inferior, or the productivity of the laminate can decline (for example, the productivity declines because when the rubber layer is formed by depositing the polymer latex on the substrate in a state where the substrate covers a predetermined mold, the polymer latex may deposit on the mold due to pass through, which makes it difficult to remove the obtained laminate from the mold).

The ratio ($t_2/t_1$) of the thickness of the portion of the rubber layer formed on the substrate that has permeated into the interior of the substrate (the thickness $t_2$ of the permeated rubber layer shown in FIG. 1(B)) to the thickness of the rubber layer formed on the substrate from the surface of the substrate (the thickness $t_1$ of the surface rubber layer shown in FIG. 1(B)) is preferably 0.001 to 15, more preferably 0.005 to 10, still more preferably 0.01 to 5 from the viewpoint of balancing the comfort during wearing, the flexibility, and the wear resistance to a high degree.

The ratio ($t_1/d$) of the thickness of the rubber layer formed on the substrate from the surface of the substrate (the thickness $t_1$ of the surface rubber layer shown in FIG. 1(B)) to the thickness of the substrate (the substrate layer average thickness d of the fiber substrate shown in FIG. 1(B)) is preferably 0.1 to 300, more preferably 0.15 to 30, still more preferably 0.2 to 15 from the viewpoint of balancing the comfort during wearing, the flexibility, and the wear resistance of the laminate obtained by the production method according to the present invention to a high degree. The total thickness of the laminate (the total of the thickness $t_1$ of the surface rubber layer and the thickness of the substrate layer average thickness d of the fiber substrate shown in FIG. 1(B)) is preferably 0.2 to 8 am, more preferably 0.2 to 4.5 am. In the microstructure of the fiber substrate, the thickness of the fiber substrate may be different in portions where the fibers densely overlap and portions where the fibers sparsely overlap. The thicknesses of the portions where the fibers densely overlap are regarded as the thicknesses of the fiber substrate shown in FIG. 1(B), and the substrate layer average thickness d of the fiber substrate is determined as the average thereof.

Further, any type of polymer can be used as the polymer constituting of the polymer latex to be used in the production method according to the present invention without particular limitation. Examples thereof include natural rubber; conjugated diene type rubbers obtained by polymerizing or copolymerizing a conjugated diene such as butadiene or isoprene; and the like. Among these, the conjugated diene type rubbers are preferable. Examples of the conjugated diene rubbers include so-called nitrile rubber obtained by copolymerizing nitrile group-containing monomers, isoprene rubber, styrene-butadiene rubber, chloroprene rubber, and the like. Among these, nitrile rubber is particularly preferable.

Any nitrile rubber can be used without particular limitation. A copolymer obtained by copolymerizing an α,β-ethylenically unsaturated nitrile monomer and an additional copolymerizable monomer optionally used can be used.

Any α,β-ethylenically unsaturated nitrile monomer can be used without particular limitation. An ethylenically unsaturated compound having a nitrile group and preferably 3 to 18 carbon atoms can be used. Examples of such an α,β-ethylenically unsaturated nitrile monomer include acrylonitrile, methacrylonitrile, halogen-substituted acrylonitriles, and the like. Among these, acrylonitrile is particularly preferable. Note that, these α,β-ethylenically unsaturated nitrile monomers may be used alone or in combinations of two or more.

The content ratio of the α,β-ethylenically unsaturated nitrile monomer unit in the nitrile rubber is preferably 10 to 45% by weight, more preferably 20 to 40% by weight, still more preferably 30 to 40% by weight of the total monomer units. By controlling the content ratio of the α,β-ethylenically unsaturated nitrile monomer unit within the range described above, the obtained laminate can have excellent solvent resistance. In addition, by controlling the content ratio of the α,β-ethylenically unsaturated nitrile monomer unit within the above range, the nitrile rubber gels and coagulates more successfully in the process of forming the rubber layer by the heat-sensitive coagulating process using the polymer latex containing the nitrile rubber, and the rubber layer is formed more successfully. This can reduce an uncomfortable feel to a hand when the obtained laminate is worn as a protective glove or the like, thus further improving comfort during wearing.

Further, the nitrile rubber preferably contains a conjugated diene monomer unit from the viewpoint of imparting rubber elasticity. The conjugated diene monomer forming the conjugated diene monomer unit is preferably a conjugated diene monomer having 4 to 6 carbon atoms such as 1,3-butadiene, isoprene, 2,3-dimethyl-1,3-butadiene, 1,3-pentadiene, chloroprene, and the like, more preferably 1,3-butadiene and isoprene, particularly preferably 1,3-butadiene. Note that these conjugated diene monomers may be used alone or in combinations of two or more.

The content ratio of the conjugated diene monomer unit is preferably 40 to 80% by weight, more preferably 52 to 78% by weight of the total monomer units constituting the nitrile rubber. By controlling the content ratio of the conjugated diene monomer unit within the range described above, the obtained laminate can have improved flexibility.

Further, the nitrile rubber may include a monomer forming an α,β-ethylenically unsaturated nitrile monomer unit and an additional ethylenically unsaturated acid monomer copolymerizable with the monomer forming the conjugated diene monomer unit.

Any additional copolymerizable ethylenically unsaturated acid monomer can be used without limitation. Examples thereof include carboxyl group-containing ethylenically unsaturated monomers, sulfonic acid group-containing ethylenically unsaturated monomers, phosphoric acid group-containing ethylenically unsaturated monomers, and the like.

Any carboxyl group-containing ethylenically unsaturated monomer can be used without particular limitation. Examples thereof include ethylenically unsaturated monocarboxylic acids such as acrylic acid, methacrylic acid, and crotonic acid; ethylenically unsaturated polyvalent carboxylic acids and anhydrides thereof, such as fumaric acid, maleic acid, itaconic acid, maleic anhydride, itaconic anhydride; partially esterified products of ethylenically unsaturated polyvalent carboxylic acids, such as methyl maleate and methyl itaconate; and the like.

Any sulfonic acid group-containing ethylenically unsaturated monomer can be used without particular limitation. Examples thereof include vinylsulfonic acid, methylvinylsulfonic acid, styrenesulfonic acid, (meth)allylsulfonic acid, ethyl (meth)acrylate-2-sulfonate, 2-acrylamide-2-hydroxypropanesulfonic acid, and the like.

Any phosphoric acid group-containing ethylenically unsaturated monomer can be used without particular limitation. Examples thereof include propyl (meth)acrylate-3-chloro-2-phosphate, ethyl (meth)acrylate-2-phosphate, 3-allyloxy-2-hydroxypropane phosphoric acid, and the like.

These additional copolymerizable ethylenically unsaturated acid monomers may be used as alkali metal salts or ammonium salts, and may be used alone or in combinations of two or more. Among the additional copolymerizable ethylenically unsaturated acid monomers mentioned above, a carboxyl group-containing ethylenically unsaturated monomer is preferable, an ethylenically unsaturated monocarboxylic acid is more preferable, and a methacrylic acid is particularly preferable.

The polymer latex can be obtained by emulsion polymerization of a monomer mixture containing the above-mentioned monomers, for example. In the emulsion polymerization, ordinarily used polymerization additives, such as an emulsifier, a polymerization initiator, a molecular weight adjuster, and the like can be used.

Any emulsifier can be used in the emulsion polymerization without particular limitation. Examples of thereof include anionic surfactants, nonionic surfactants, cationic surfactants, amphoteric surfactants, and the like. A nonionic surfactant is preferable from the viewpoint of proper progress of the heat-sensitive coagulation. In particular, in the case of the coagulant dipping process using a coagulant solution containing a coagulant such as calcium nitrate and the like, from the viewpoint of efficient progress of salt coagulation, an anionic surfactant is suitably used as an emulsifier in the emulsion polymerization. In the present invention, from the viewpoint of proper progress of the heat-sensitive coagulation, a nonionic surfactant is preferable, and a water-soluble nonionic polymer having a cloud point of an ordinary temperature or higher and 100° C. or less is preferable. Specific examples of the nonionic surfactant include polyoxyethylene alkyl ethers, polyoxyethylene alkyl phenol ethers, polyoxyethylene alkyl esters, and polyoxyethylene sorbitan alkyl esters, and the like.

The amount of the emulsifier to be used in the emulsion polymerization is preferably 0.5 to 10 parts by weight, more preferably 1 to 8 parts by weight based on 100 parts by weight of the total monomers to be used.

Although any polymerization initiator can be used without limitation, a radical initiator is preferable. Any radical initiator can be used without particular limitation. Examples thereof include inorganic peroxides such as sodium persulfate, potassium persulfate, ammonium persulfate, potassium perphosphate, and hydrogen peroxide; organic peroxides such as t-butyl peroxide, cumene hydroperoxide, p-menthane hydroperoxide, di-t-butyl peroxide, t-butyl cumyl peroxide, acetyl peroxide, isobutyryl peroxide, octanoyl peroxide, dibenzoyl peroxide, 3,5,5-trimethylhexanoyl peroxide, and t-butylperoxy isobutyrate; azo compounds such as azobisisobutyronitrile, azobis-2,4-dimethylvaleronitrile, azobiscyclohexanecarbonitrile, and methyl azobisisobutyrate; and the like. Among these, an inorganic peroxide or an organic peroxide is preferable, an inorganic peroxide is more preferable, and a persulfate is particularly preferable. These polymerization initiators may be used alone or in combinations of two or more.

The amount of the polymerization initiator to be used is preferably 0.01 to 2 parts by weight, more preferably 0.05 to 1.5 parts by weight based on 100 parts by weight of the total monomers to be used.

Any molecular weight adjuster can be used without limitation. Examples thereof include α-methyl styrene dimer; mercaptans such as t-dodecyl mercaptan, n-dodecyl mercaptan, and octyl mercaptan; halogenated hydrocarbons such as carbon tetrachloride, methylene chloride, and methylene bromide; sulfur-containing compounds such as tetraethylthiuram disulfide, dipentamethylenethiuram disulfide, and diisopropyl xanthogen disulfide, and the like. Among these, mercaptans are preferable, and t-dodecylmercaptan is more preferable. These molecular weight adjusters may be used alone or in combinations of two or more.

Although the amount of the molecular weight adjuster to be used depends on its type, it is preferably 0.1 to 1.5 parts by weight, more preferably 0.2 to 1.0 parts by weight based on 100 parts by weight of the total monomers to be used.

Emulsion polymerization is usually carried out in water. The amount of the water to be used is preferably 80 to 500 parts by weight, more preferably 100 to 200 parts by weight based on 100 parts by weight of the total monomers to be used.

In the emulsion polymerization, optionally, a polymerization additive other than the above may be further used. Examples of the polymerization additive include chelating agents, dispersants, pH regulators, deoxidizing agents, particle size adjusting agents, and the like. The type and amount to be used of those polymerization additives are not particularly limited.

Examples of the method of adding the monomers include a method of adding the monomers used in the reaction vessel at a time, a method of continuously or intermittently adding the monomers according to the progress of polymerization, a method in which the reaction is carried out up to a specific conversion ratio by adding a part of the monomers and then the remaining monomers are continuously or intermittently added and polymerized, and the like. Any of these methods may be employed. In the case of mixing and adding the monomers continuously or intermittently, the composition of the mixture may be constant or may be changed.

Further, the monomer to be used may be mixed and then added to the reaction vessel, or each monomer may be individually added to the reaction vessel.

Any polymerization temperature during emulsion polymerization can be used without particular limitation. It is usually 0 to 95° C., preferably 5 to 70° C. Any polymerization time can be used without particular limitation. It is usually about 5 to 40 hours.

Any polymerization terminator usually used in emulsion polymerization can be used without particular limitation. Specific examples thereof include hydroxyamine compounds such as hydroxylamine, hydroxyamine sulfate, diethylhydroxyamine, and hydroxyamine sulfonic acid and alkali metal salts thereof; sodium dimethyldithiocarbamate; hydroquinone derivatives; catechol derivatives; aromatic hydroxy dithiocarboxylic acids such as hydroxydimethyl benzene thiocarboxylic acid, hydroxydiethyl benzene dithiocarboxylic acid, and hydroxydibutyl benzene dithiocarboxylic acid, and alkali metal salts thereof; and the like.

The amount of the polymerization terminator to be used is not particularly limited, but it is usually 0.05 to 2 parts by weight based on 100 parts by weight of the total monomers to be used.

After stopping the polymerization reaction, if desired, unreacted monomers may be removed, and the solids content and pH may be adjusted.

The weight average particle size of polymer particles constituting the polymer latex is usually 30 to 1000 nm, preferably 50 to 500 nm, more preferably 70 to 200 nm. By controlling the weight average particle size of the polymer particles within the range described above, the viscosity of the polymer latex is controlled to an appropriate level, resulting in further improved handleability of the polymer latex and further improved moldability during molding the rubber layer, whereby a laminate having a more uniform rubber layer is obtained.

The solids content of the polymer latex is usually 20 to 65% by weight, preferably 30 to 60% by weight, more preferably 35 to 55% by weight. By controlling the solids content of the polymer latex within the range described above, the transport efficiency of the latex can be improved, and the viscosity of the polymer latex is controlled to an appropriate level, resulting in improved handleability of the polymer latex.

The pH of the polymer latex is usually 5 to 13, preferably 7 to 10, more preferably 7.5 to 9. By controlling the pH of the polymer latex within the range described above, the mechanical stability is improved, suppressing the occurrence of coarse aggregates during transfer of the polymer latex, and the viscosity of the polymer latex is controlled to an appropriate level, resulting in improved handleability of polymer latex.

The viscosity of the polymer latex at 25° C. used in the production method according to the present invention is 2,000 to 100,000 mPa·s, preferably 2,500 to 50,000 mPa·s, more preferably 3,000 to 20,000 mPa·s, still more preferably 4,000 to 20,000 mPa·s, particularly preferably 5,000 to 20,000 mPa·s. By using the polymer latex having a viscosity in the above range at 25° C., the thickness of the rubber layer formed on the substrate from the surface of the substrate can be controlled to 200 µm or more. Even in the case where the rubber layer is formed with such a thickness, the obtained laminate can have excellent comfort during wearing, flexibility, and wear resistance. Note that the viscosity of the polymer latex at 25° C. can be measured, for example, using a B-type viscometer at 25° C. under the condition of a rotational speed of 6 rpm. Further, examples of methods for adjusting the viscosity of the polymer latex at 25° C. include a method for adjusting the concentration of the polymer in the polymer latex, a method for preparing a compound serving as a thickener for the polymer latex (which is used as a latex composition in this case), and the like.

In addition, the polymer latex is preferably a polymer latex in which compounding agents such as a crosslinker, a heat-sensitive coagulant, and the like are compounded. That is, the polymer latex is preferably used as a latex composition. Note that when the polymer latex is used as a latex composition as described above, the polymer latex has a viscosity in a range of 2,000 to 100,000 mPa·s at 25° C. in a state where the polymer latex contains the above compounding agents such as a crosslinker, a heat-sensitive coagulant, and the like, and compounding agents such as an emulsifier, a thickener, and the like described below.

The crosslinker is preferably a sulfur crosslinker. Any sulfur crosslinker can be used without particular limitation. Examples thereof include sulfur such as powdered sulfur, sublimed sulfur, precipitated sulfur, colloidal sulfur, surface-treated sulfur, and insoluble sulfur; sulfur-containing compounds such as sulfur chloride, sulfur dichloride, morpholine disulfide, alkylphenol disulfide, dibenzo thiazyl disulfide, caprolactam disulfide, phosphorus-containing polysulfide, and polysulfide polymers; sulfur donating compounds such as tetramethyl thiuram disulfide, selenium dimethyl dithiocarbamate, and 2-(4'-morpholinodithio)benzothiazole; and the like. These crosslinkers may be used alone or in combinations of two or more.

When the crosslinker is compounded in the polymer latex, the amount of the crosslinker to be compounded is preferably 0.01 to 5 parts by weight, more preferably 0.05 to 3 parts by weight, still more preferably 0.1 to 2 parts by weight relative to 100 parts by weight of the polymer contained in the polymer latex.

When sulfur is used as the crosslinker, it is preferably used together with a crosslinking accelerator (vulcanization accelerator) or zinc oxide.

Any crosslinking accelerator (vulcanization accelerator) can be used without particular limitation. Examples of thereof include dithiocarbamic acids and zinc salts thereof, such as diethyl dithiocarbamic acid, dibutyl dithiocarbamic acid, di-2-ethylhexyl dithiocarbamic acid, dicyclohexyl dithiocarbamic acid, diphenyl dithiocarbamic acid, and dibenzyl dithiocarbamic acid; 2-mercaptobenzothiazole, zinc 2-mercaptobenzothiazole, 2-mercaptothiazoline, dibenzothiazyl disulfide, 2-(2,4-dinitrophenylthio)benzothiazole, 2-(N,N-diethylthio-carbamoylthio)benzothiazole, 2-(2,6-dimethyl-4-morpholinothio)benzothiazole, 2-(4'-morpholinodithio)benzothiazole, 4-morpholinyl-2-benzothiazyl disulfide, 1,3-bis(2-benzothiazyl-mercaptomethyl) urea, and the like. Among these, zinc diethyl dithiocarbamate, zinc dibutyl dithiocarbamate, 2-mercaptobenzothiazole, and zinc 2-mercaptobenzothiazole are preferable. These crosslinking accelerators may be used alone or in combinations of two or more.

Any heat-sensitive coagulant that can coagulate the polymer latex by heating can be used without particular limitation. Examples thereof include silicone oils such as epoxy-modified silicone oil, alkyl-modified silicone oil, alkyl aralkyl-modified silicone oil, amino-modified silicone oil, carboxyl-modified silicone oil, alcohol-modified silicone oil, fluorine-modified silicone oil, and polyether-modified silicone oil; polysiloxans such as dimethylpolysiloxane, methylphenylpolysiloxane, methylhydropolysiloxane and diorganopolysiloxan diol; fluoroalkyl ester polymers such as 1,1-dihydroperfluorooctyl acrylate polymer, and perfluoroalkylethyl acrylate-alkyl acrylate copolymer; and the like. By compounding the heat-sensitive coagulant to the polymer latex, the heat-sensitive coagulation of the polymer latex is allowed to progress more properly.

When the heat-sensitive coagulant is compounded in the polymer latex, the amount of the heat-sensitive coagulant to be compounded is preferably 0.01 to 10 parts by weight, more preferably 0.1 to 8 parts by weight, still more preferably 0.1 to 5 parts by weight based on 100 parts by weight of the polymer contained in the polymer latex. By controlling the heat-sensitive coagulant to be compounded within the range described above, the heat-sensitive coagulation of the polymer latex is allowed to progress more properly. Note that in the present invention, the heat-sensitive coagulant not only coagulates the polymer latex when heated, but also serves as a thickener to thicken the polymer latex. Accordingly, as well as from the viewpoint of adjusting the viscosity of the polymer latex to the predetermined viscosity described above, the amount of the heat-sensitive coagulation to be compounded is preferably controlled within the range described above.

In addition, the emulsifier may be further compounded in the polymer latex to improve the stability of the polymer latex. Similarly to the case of the emulsion polymerization, the emulsifier is preferably a nonionic surfactant, preferably a water-soluble nonionic polymer having a cloud point of 30° C. or more and 100° C. or less, more preferably a water-soluble nonionic polymer having a cloud point of 45° C. or more and 90° C. or less.

When the emulsifier is further compound in the polymer latex, the content of the emulsifier to be compounded in the polymer latex (the content thereof including the emulsifier used in the emulsion polymerization of the polymer latex) is preferably 20 to 0.01% by weight, more preferably 15 to 0.02% by weight, still more preferably 10 to 0.05% by weight. By controlling the content of the emulsifier within the range described above, the stability of the polymer latex can be improved while at the same time the rubber layer can be properly formed by the heat-sensitive coagulation for forming the rubber layer.

Further, in addition to the above described heat-sensitive coagulant, a thickener other than the heat sensitive-coagulant may be appropriately compounded in the polymer latex. Any thickener can be used without particular limitation. Examples of the thickener include vinyl compounds such as polyvinyl alcohol and polyvinyl pyrrolidone; cellulose derivatives such as hydroxyethyl cellulose, hydroxypropyl cellulose, and carboxymethyl cellulose salts; polycarboxylic acid compounds and sodium salts thereof; polyoxyethylene derivatives such as polyethylene glycol ethers; and the like.

In the method for producing the laminate according to the present invention, as described above, by contacting the substrate in a heated state with the polymer latex, the polymer latex is deposited on the surface of the substrate. Since the polymer latex deposit on the surface of the substrate is in contact with the heated substrate, the polymer latex deposit gels and coagulates to form the rubber layer having a thickness of 200 μm or more from the surface of the substrate. Any method for contacting the substrate with the polymer latex can be used without particular limitation. Examples thereof include a method for dipping the substrate in the polymer latex and the like. When the substrate is dipped in the polymer latex, the substrate in a heated state may be dipped in the polymer latex in a state where the substrate is supported on a mold for dipping having a desired shape, for example, by attaching the substrate to the mold. In this case, the mold may be heated as well as the substrate. Note that in the case of using a polymer latex in which a crosslinker has been added, a polymer latex aged in advance (also referred to as prevulcanized) may be used.

Any mold for dipping that supports the substrate can be used without particular limitation. Materials thereof can be various, such as ceramics, glass, metal, plastic, and the like. The shape of the mold for dipping can be a desired shape that matches the shape of the final product. For example, in the case where the laminate having the rubber layer is a protective glove, the mold for dipping which the fiber substrate as a substrate covers is preferably a mold for dipping corresponding to each type of glove such as a mold having a shape of a wrist to finger tips, or the like.

In the process in which the substrate is contacted with the polymer latex, the substrate is heated in advance (also referred to as preheated), and then the fiber substrate supported on the mold for dipping in a heated state is contacted with the polymer latex. The temperature of the substrate when the substrate contacts the polymer latex (also referred to as preheat temperature) is preferably 30 to 100° C., more preferably 40 to 95° C., still more preferably 45 to 90° C., particularly preferably 50 to 90° C., most preferably 55 to 90° C. By controlling the preheat temperature of the substrate within the range described above, the temperature of the substrate immediately before the contact with the polymer latex can be controlled in preferable ranges below. The temperature of the substrate immediately before the substrate contacts the polymer latex is preferably 25 to 100° C., more preferably 35 to 95° C., still more preferably 40 to 90° C., particularly preferably 45 to 90° C., most preferably 50 to 90° C. By controlling the temperature of the substrate within the range described above, in the case where the rubber layer is formed using the polymer latex by the heat-sensitive coagulating process, the rubber layer can be formed more properly.

Further, the polymer latex deposit on the substrate is preferably dried after the contact of the substrate with the polymer latex. Any drying temperature in this process can be used without particular limitation. The drying temperature is preferably 10 to 80° C., more preferably 15 to 80° C. Further, any drying time in this process can be used without particular limitation. The drying time is preferably 5 seconds to 120 minutes, more preferably 10 seconds to 60 minutes.

Moreover, in the case where a crosslinker is compounded to the polymer latex, the crosslinking may be optionally performed by heating.

In addition, in the case where the rubber layer is formed in a state where the substrate is supported by the mold for dipping, the laminate can be obtained by removing the substrate having the rubber layer formed thereon from the mold for dipping. As the method for removing, a method of peeling from the mold for dipping by hand and a method of peeling by water pressure or pressure of compressed air can be employed.

EXAMPLES

Hereinafter, the present invention will be described specifically by way of Examples, but the present invention is not limited to these Examples. In the following, unless stated otherwise, the term "part(s)" is based on weight. The test or evaluation methods of the physical properties and characteristics are as follows.

Viscosity of Latex Composition

The viscosity of the latex composition was measured using a B-type viscometer at a temperature of 25° C. The viscosity up to 20,000 mPa·s was measured using a rotor M3 under the condition of a rotational speed of 6 rpm. The viscosity of the latex composition 20,000 mPa·s or more was measured using a rotor M4 under the condition of a rotational speed of 6 rpm.

Thickness $t_1$ of Surface Rubber Layer and Thickness $t_2$ of Permeated Rubber Layer For the protective glove (laminate), the thickness $t_1$ of the surface rubber layer and the thickness $t_2$ of the permeated rubber layer were measured by observing a cross-section of the rubber layer of a 12 an palm portion from the tip of the middle finger using an optical microscope (product name "VHX-200", manufactured by Keyence Corporation). Describing a specific measurement method with reference to FIG. 1, the thickness $t_1$ of the surface rubber layer was determined by measuring the distance from the surface of the fiber substrate to the surface of the rubber layer at ten sites, and calculating the number average value of the measurement results. The thickness $t_2$ of the permeated rubber layer was determined by measuring the distance from the surface of the fiber substrate to the deepest portion of the permeated rubber at ten sites, and calculating the number average value of the measurement results.

Cracks in Surface Rubber Layer

The surface rubber layer of the protective glove (laminate) was visually observed and evaluated for cracks.

Peeling at Interface of Surface Rubber Layer

For the protective glove (laminate), peeling of the surface rubber layer was evaluated by visually observing a cross-section of the rubber layer of a 12 an palm portion from the tip of the middle finger.

Pass Through

The protective glove (laminate) was evaluated for pass through by visually observing whether at least a part of the rubber layer that permeated from one surface of the fiber substrate completely passed through the fiber substrate and reached the other surface.

Comfort During Wearing

Comfort during wearing was evaluated by conducting a survey on how much fatigue was felt in the hands after simple work such as cleaning, carrying, and the like wearing the gloves on the hands. The survey was conducted for ten people. The number of the people who felt fatigue during wearing was totalized and the degree of the fatigue during wearing was evaluated using the criteria below.

Good: Less than three people felt fatigue.
Fair: Three or more and less than six people felt fatigue.
Poor: Six or more people felt fatigue.

Flexibility

The protective glove (laminate) was worn by each of ten people and the flexibility of the glove was evaluated by them according to the following three evaluation scores. The average value of the evaluation scores for each Example was determined. The evaluation score that was closest to the average value was defined as the evaluation score for each Example. For example, when the average value was 2.8, the evaluation score was "3: Soft", and the like.

3: Soft
2: Slightly Hard
1: Hard

Wear Resistance

A wear test was conducted and the evaluation was performed using Martindale abrasion tester (product name: "STM 633", manufactured by SATRA Technology) in accordance with a method described in EN 388. Specifically, the protective glove (laminate) was repeatedly rubbed while a predetermined weight was applied thereto. The number of times of rubbing before breakage of the glove was obtained. According to the number of times of rubbing before breakage of the glove, each glove was classified into either one of LEVEL 0 to LEVEL 4. The higher the level, the better the wear resistance.

LEVEL 4: The number of rotations is 8,000 or more rotations.
LEVEL 3: The number of rotations is 2,000 or more and less than 8,000 rotations.
LEVEL 2: The number of rotations is 500 or more and less than 2,000 rotations.
LEVEL 1: The number of rotations is 100 or more and less than 500 rotations.
LEVEL 0: The number of rotations is less than 100 rotations.

Methanol Permeation Resistance

A methanol permeation test was conducted in accordance with a method described in EN 374-3. In the test, the surface rubber layer forming surface of the protective glove (laminate) is in contact with methanol. The results were classified into LEVEL 0 to LEVEL 4. The higher level indicates better protection performance against the solvent since the higher the level, the better the methanol permeation resistance.

LEVEL 4: The permeation time is 120 minutes or more.
LEVEL 3: The permeation time is 60 or more and less than 120 minutes.
LEVEL 2: The permeation time is 30 or more and less than 60 minutes.
LEVEL 1: The permeation time is 10 or more and less than 30 minutes.
LEVEL 0: The permeation time is less than 10 minutes.

Example 1

Preparation of Latex Composition for Dip Molding

A latex of a nitrile rubber (a) in which the content ratio of an acrylonitrile unit is 35% by weight (trade name "Nipol LX551A", manufactured by Zeon Corporation, emulsifier: nonionic surfactant) was prepared as a polymer latex. An aqueous dispersion of the compounding agents was prepared to contain, on a solids content basis relative to 100 parts of the nitrile rubber (a) in the latex: 2.50 parts of a polyoxyethylene alkyl ether (product name "EMULGEN 709", nonionic surfactant, cloud point 56° C., manufactured by Kao Corporation) as an emulsifying agent, 0.45 parts of polyether-modified silicone oil (trade name "TPA 4380", manufactured by Toshiba Silicone Co., Ltd.) as a heat-sensitive coagulant, 0.01 parts of anti-foaming agent (trade name "SM 5512", manufactured by Dow Corning Toray Co., Ltd.), 1.00 part of colloidal sulfur (manufactured by Hosoi Chemical Industry Co., Ltd.), 0.50 parts of zinc dibutyldithiocarbamate (manufactured by Ouchi Shinko Chemical Industrial Co., Ltd.), 1.50 parts of zinc oxide, and 3.00 parts of titanium oxide. The prepared aqueous dispersion was added to the latex to thereby obtain a latex composition. Note that during the addition of the aqueous dispersion of the compounding agents, a predetermined amount of the aqueous dispersion of the compounding agents was slowly added while stirring the latex. The solids content of the latex composition was subsequently adjusted to 45% by weight, and then aging (also referred to as prevulcanizing) was carried out at a temperature of 30° C. for 48 hours, to thereby obtain a latex composition for dip molding. The viscosity of the obtained latex composition for dip molding at 25° C. was 6,000 mPa·s.

Production of Protective Glove (Laminate)

The obtained latex composition for dip molding was used to form a rubber layer on a glove-shaped fiber substrate (material: nylon, substrate layer average thickness d of fiber substrate: 0.70 am, 13 gauge) which covered a metal glove mold by the heat-sensitive coagulating process. Specifically, after preheated at 67° C., the fiber substrate covering the metal glove mold was dipped in the above latex composition for dip molding for 2 seconds, and pulled from the latex composition for dip molding. Note that the temperature of the fiber substrate immediately before dipping was 67° C. Then, the latex composition for dip molding deposited on the fiber substrate was dried at a temperature of 80° C. for 30 minutes to thereby form a rubber layer. Next, the nitrile rubber in the rubber layer was cross-linked by performing a heat treatment at 100° C. for 60 minutes to form a rubber layer. The fiber substrate having the rubber layer formed thereon was then peeled from the metal glove mold to obtain a protective glove (laminate). For the protective glove (laminate), the thickness $t_1$ of the permeated rubber layer and the thickness $t_2$ of the surface rubber layer were measured, and cracks in the surface rubber layer, peeling at an interface of the surface rubber layer, pass through, comfort during wearing, flexibility, wear resistance, and methanol permeation resistance were evaluated in accordance with the methods described above. The results are shown in Table 1.

Example 2

A latex composition for dip molding was obtained in the same manner as in Example 1 except that the amount of the polyether-modified silicone oil compounded as the heat-sensitive coagulant was changed from 0.45 parts to 0.60 parts. The viscosity of the obtained latex composition for dip molding at 25° C. was 11,000 mPa·s.

Then, a protective glove (laminate) was produced in the same manner as Example 1 and evaluated in the same manner as above except that the latex composition for dip molding obtained above was used and the temperature (preheat temperature) of the fiber substrate covering the metal glove mold was 66° C. Note that the temperature of the fiber substrate immediately before dipping was 66° C. The results are shown in Table 1.

Example 3

A latex composition for dip molding was obtained in the same manner as in Example 1 except that the amount of the polyether-modified silicone oil compounded as the heat-sensitive coagulant was changed from 0.45 parts to 0.70 parts. The viscosity of the obtained latex composition for dip molding at 25° C. was 13,000 mPa·s.

Then, a protective glove (laminate) was produced in the same manner as Example 1 and evaluated in the same manner as above except that the latex composition for dip molding obtained above was used and the temperature (preheat temperature) of the fiber substrate covering the metal glove mold was 65° C. Note that the temperature of the fiber substrate immediately before dipping was 65° C. The results are shown in Table 1.

Comparative Example 1

Preparation of Latex Composition for Dip Molding

A nitrile rubber (b) in which the content ratio of an acrylonitrile unit is 27% by weight (trade name "Nipol LX550L", manufactured by Zeon Corporation) was prepared as a polymer latex. An aqueous dispersion of the compounding agents was prepared to contain, on a solids content basis relative to 100 parts of the nitrile rubber (b) in the latex: 0.01 parts of anti-foaming agent (trade name "SM 5512", manufactured by Dow Corning Toray Co., Ltd.), 1.00 part of colloidal sulfur (manufactured by Hosoi Chemical Industry Co., Ltd.), 0.50 parts of zinc dibutyldithiocarbamate (manufactured by Ouchi Shinko Chemical Industrial Co., Ltd.), 1.50 parts of zinc oxide, and 3.00 parts of titanium oxide. The prepared aqueous dispersion was added to the latex to thereby obtain a latex composition. Note that during the addition of the aqueous dispersion of the compounding agents, a predetermined amount of the aqueous dispersion of the compounding agents was slowly added while stirring the latex. Next, the latex composition was aged (also referred to as prevulcanized) at a temperature of 30° C. for 48 hours. Then, sodium polyacrylate (trade name "Aron A-7100", manufactured by Toagosei Co., Ltd.) was further added as a thickener in proportions of 0.2 parts by weight to the aged latex composition to thereby obtain a latex composition for dip molding. The viscosity of the obtained latex composition for dip molding at 25° C. was 1,500 mPa·s.

Production of Protective Glove (Laminate)

A rubber layer was formed on a glove-shaped fiber substrate (material: nylon, substrate layer average thickness d of fiber substrate: 0.70 am, 13 gauge) by the coagulant dipping process. Specifically, the glove-shaped fiber substrate covering the metal glove mold was dipped for 5 seconds in a methanol solution of calcium nitrate (concentration of calcium nitrate: 2.0% by weight) as a coagulant solution in the heated state at 46° C. The glove-shaped fiber substrate was pulled from the coagulant solution, and then dried at a temperature of 30° C. for 60 seconds. Then, the fiber substrate covering the metal glove mold was dipped in the above latex composition for dip molding for 3 seconds, and pulled from the latex composition for dip molding, and then dried at a temperature of 30° C. for 30 minutes to thereby form a rubber layer. Note that the temperature of the fiber substrate immediately before dipping was 22° C. Next, the nitrile rubber in the rubber layer was cross-linked by performing a heat treatment at 100° C. for 60 minutes to form the rubber layer. The fiber substrate having the rubber layer formed thereon was then peeled from the metal glove mold to obtain a protective glove (laminate). The obtained protective glove (laminate) was evaluated in the same manner as in Example 1. The results are shown in Table 1.

Note that the protective glove in Comparative Example 1 had partial pass through where the thickness $t_2$ of the permeated layer measured by the method described above was greater than the substrate layer average thickness d of the fiber substrate (0.70 mm).

Comparative Example 2

A latex composition for dip molding was obtained in the same manner as in Comparative Example 1 except that the amount of sodium polyacrylate compounded as the thickener was changed from 0.2 parts to 0.3 parts. The viscosity of the obtained latex composition for dip molding at 25° C. was 3,000 mPa·s.

Then, a protective glove (laminate) was produced in the same manner as Comparative Example 1 and evaluated in the same manner as above except that the latex composition for dip molding obtained above was used and the temperature of the fiber substrate covering the metal glove mold was 47° C. Note that the temperature of the fiber substrate immediately before dipping was 23° C. The results are shown in Table 1.

Comparative Example 3

A latex composition for dip molding was obtained in the same manner as in Comparative Example 1 except that the amount of sodium polyacrylate compounded as the thickener was changed from 0.2 parts to 0.4 parts. The viscosity of the obtained latex composition for dip molding at 25° C. was 6,000 mPa·s.

Then, a protective glove (laminate) was produced in the same manner as Comparative Example 1 and evaluated in the same manner as above except that the latex composition for dip molding obtained above was used and the temperature of the fiber substrate covering the metal glove mold was 45° C. Note that the temperature of the fiber substrate immediately before dipping was 21° C. The results are shown in Table 1.

Comparative Example 4

A latex composition for dip molding was obtained in the same manner as in Comparative Example 1 except that the amount of sodium polyacrylate compounded as the thickener was changed from 0.2 parts to 0.6 parts. The viscosity of the obtained latex composition for dip molding at 25° C. was 10,000 mPa·s.

Then, a protective glove (laminate) was produced in the same manner as Comparative Example 1 and evaluated in the same manner as above except that the latex composition for dip molding obtained above was used. Note that the temperature of the fiber substrate immediately before dipping was 22° C. The results are shown in Table 1.

Comparative Example 5

A protective glove (laminate) was produced in the same manner as Comparative Example 2 and evaluated in the same manner as above except that the fiber substrate covering the metal glove mold was dipped in the latex composition for dip molding and dried, and subsequently in the same condition dipped in the latex composition for dip molding for the second time and dried to thereby form a rubber layer (i.e. the number of times of dipping was twice), and that the temperature of the fiber substrate covering the metal glove mold was 45° C. Note that the temperature of the fiber substrate immediately before dipping was 21° C. The results are shown in Table 1.

Comparative Example 6

A latex composition for dip molding was obtained in the same manner as Comparative Example 2 except that 100 parts of the nitrile rubber (a) was used instead of 100 parts of the nitrile rubber (b) as a polymer latex. The viscosity of the obtained latex composition for dip molding at 25° C. was 3,000 mPa·s.

Then, a protective glove (laminate) was produced in the same manner as Comparative Example 1 and evaluated in the same manner as above except that the latex composition for dip molding obtained above was used. Note that the surface temperature of the fiber substrate immediately before dipping was 22° C. The results are shown in Table 1.

TABLE 1

| | | Example | | | Comparative Example | | | | | |
|---|---|---|---|---|---|---|---|---|---|---|
| | | 1 | 2 | 3 | 1 | 2 | 3 | 4 | 5 | 6 |
| Composition of latex composition | | | | | | | | | | |
| Nitrile rubber (a) (acrylonitrile unit: 35 wt %) | (parts of weight) | 100 | 100 | 100 | | | | | | 100 |
| Nitrile rubber (b) (acrylonitrile unit: 27 wt %) | (parts of weight) | | | | 100 | 100 | 100 | 100 | 100 | |
| Heat-sensitive coagulant | (parts of weight) | 0.45 | 0.60 | 0.70 | | | | | | |
| Thickener | (parts of weight) | | | | 0.2 | 0.3 | 0.4 | 0.6 | 0.3 | 0.3 |
| Viscosity of latex composition | (mPa · s) | 6,000 | 11,000 | 13,000 | 1,500 | 3,000 | 6,000 | 10,000 | 3,000 | 3,000 |
| Method for producing laminate | | | | | | | | | | |
| Coagulation process | | Heat-sensitive coagulation process | Heat-sensitive coagulation process | Heat-sensitive coagulation process | Coagulent dipping process | Coagulent dipping process | Coagulent dipping process | Coagulent dipping process | Coagulent dipping process | Coagulent dipping process |
| Temperature of fiber substrate at dipping into coagulant solution | (° C.) | — | — | — | 46 | 47 | 45 | 46 | 45 | 46 |
| Preheat temperature of fiber substrate | (° C.) | 67 | 66 | 65 | — | — | — | — | — | — |
| Surface temperature of fiber substrate immediately before dipping | (° C.) | 67 | 66 | 65 | 22 | 23 | 21 | 22 | 21 | 22 |
| Number of times of dipping | (Number of times) | 1 | 1 | 1 | 1 | 1 | 1 | 1 | 1 | 1 |
| Protective glove | | | | | | | | | | |
| Total thickness of laminate | (mm) | 1.24 | 1.45 | 1.50 | 0.85 | 0.89 | 1.20 | 1.50 | 1.35 | 0.90 |
| Substrate layer average thickness d | (mm) | 0.70 | 0.70 | 0.70 | 0.70 | 0.70 | 0.70 | 0.70 | 0.70 | 0.70 |
| Total thickness of rubber layer | (mm) | 1.17 | 1.25 | 1.27 | 0.86 | 0.44 | 0.70 | 0.95 | 0.90 | 0.50 |
| Thickness $t_1$ of surface rubber layer | (mm) | 0.54 | 0.75 | 0.80 | 0.15 | 0.19 | 0.51 | 0.80 | 0.65 | 0.20 |

TABLE 1-continued

|  |  | Example | | | Comparative Example | | | | | |
| --- | --- | --- | --- | --- | --- | --- | --- | --- | --- | --- |
|  |  | 1 | 2 | 3 | 1 | 2 | 3 | 4 | 5 | 6 |
| Thickness $t_2$ of permeated rubber layer | (mm) | 0.63 | 0.50 | 0.47 | 0.71 | 0.25 | 0.19 | 0.15 | 0.25 | 0.30 |
| $t_2/t_1$ |  | 1.17 | 0.67 | 0.59 | 4.73 | 1.32 | 0.37 | 0.19 | 0.38 | 1.50 |
| $t_1/d$ |  | 0.77 | 1.07 | 1.14 | 0.21 | 0.27 | 0.73 | 1.14 | 0.93 | 0.29 |
| Evaluation | | | | | | | | | | |
| Cracks in surface rubber layer |  | No | No | No | No | No | Yes | Yes | No | No |
| Peeling of surface layer |  | No | No | No | No | No | No | No | Yes | No |
| Pass through |  | No | No | No | No | No | No | No | No | No |
| Comfort during wearing (degree of fatigue during wearing) |  | Good | Good | Good | Good | Good | Fair | Poor | Poor | Fair |
| Flexibility |  | 3 | 3 | 3 | 2 | 3 | 2 | 1 | 2 | 2 |
| Wear Resistance | | | | | | | | | | |
| Number of rotations | (rpm) | 8,000 | 8,000 | 8,000 | 8,000 | 8,000 | 5,000 | 1,500 | 8,000 | 5,000 |
| LEVEL |  | LEVEL 4 | LEVEL 4 | LEVEL 4 | LEVEL 4 | LEVEL 4 | LEVEL 3 | LEVEL 2 | LEVEL 4 | LEVEL 3 |
| Methanol permeation resistance |  | LEVEL 3 | LEVEL 4 | LEVEL 4 | LEVEL 0 | LEVEL 0 | LEVEL 3 | LEVEL 4 | LEVEL 4 | LEVEL 1 |

As shown in Table 1, when the rubber layer was formed on the fiber substrate by the heat-sensitive coagulating process using the latex composition for dip molding (polymer latex) having a viscosity of 2,000 to 100,000 mPa·s at 25° C., the obtained laminates had significantly reduced cracks and peeling in the surface rubber layer, and had excellent comfort during wearing, flexibility, wear resistance, and methanol permeation resistance (protection performance against a solvent) (Examples 1 to 3).

Meanwhile, when the rubber layer was formed on the fiber substrate by the coagulant dipping process using a coagulant solution and the latex composition for dip molding having a relatively low viscosity of 1,500 to 3,000 mPa·s at 25° C. was used, the thickness of the surface rubber layer was less than 200 μm and methanol permeation resistance (protection performance against a solvent) was inferior (Comparative Examples 1 and 2).

Moreover, when the rubber layer was formed on the fiber substrate by the coagulant dipping process using a coagulant solution and the latex composition for dip molding having a relatively high viscosity of 6,000 to 10,000 mPa·s at 25° C. was used, although the thickness of the surface rubber layer was 200 μm or more, the surface rubber layer had cracks, resulting in inferior wear resistance, comfort during wearing, and flexibility (Comparative Examples 3 and 4).

Further, when the rubber layer was formed on the fiber substrate by the coagulant dipping process using a coagulant solution and the number of times of dipping was twice, although the thickness of the surface rubber layer was 200 μm or more, the surface rubber layer had peeling, resulting in inferior comfort during wearing and flexibility (Comparative Example 5).

Moreover, when the rubber layer was formed on the fiber substrate by the coagulant dipping process using a coagulant solution and the latex composition for dip molding (polymer latex) having a viscosity of 2,000 to 100,000 mPa·s at 25° C., the comfort during wearing, the flexibility, the wear resistance, and the methanol permeation resistance (protection performance against a solvent) were inferior (Comparative Example 6).

The invention claimed is:

1. A method for producing a laminate comprising a substrate and a rubber layer, the rubber layer having a thickness of 200 μm or more from a surface of the substrate, the method comprising:
    contacting the substrate in a heated state with a polymer latex having a viscosity of 2,000 to 100,000 mPa·s at 25° C. to thereby coagulate the polymer latex in contact therewith to form the rubber layer, only once,
    wherein a polymer contained in the polymer latex is a nitrile rubber;
    the polymer latex contains a heat-sensitive coagulant; and
    the method does not include a step of contacting the substrate with a coagulant solution before contacting the substrate with the polymer latex.

2. The method for producing the laminate according to claim 1, wherein in the contacting with the polymer latex, the substrate is heated at 30° C. or higher.

3. The method for producing the laminate according to claim 1, wherein in the contacting with the polymer latex, the substrate is heated at 50° C. or higher.

4. The method for producing the laminate according to claim 1, wherein the thickness of the substrate is 0.01 to 3,000 mm, and the permeation thickness of the rubber layer into the substrate is 1 μm or more and less than the thickness of the substrate.

5. The method for producing the laminate according to claim 1, wherein the polymer latex contains a nonionic surfactant.

6. The method according to claim 1, wherein the heat-sensitive coagulant is a silicone oil or a fluoroalkyl ester polymer.

7. The method according to claim 1, wherein a temperature of the substrate when the substrate contacts the polymer latex is between 50° C. and 90° C.

8. The method according to claim 1, wherein the viscosity of the polymer latex when the substrate contacts the polymer latex is 11,000 to 100,000 mPa·s at 25° C.

9. A method for producing a protective glove using the laminate obtained by the method according to claim 1.

* * * * *